US012002425B2

(12) United States Patent
Huangfu et al.

(10) Patent No.: US 12,002,425 B2
(45) Date of Patent: Jun. 4, 2024

(54) PIXEL CIRCUIT AND DRIVING METHOD THEREFOR, AND DISPLAY APPARATUS

(71) Applicant: BOE Technology Group Co., Ltd., Beijing (CN)

(72) Inventors: Lujiang Huangfu, Beijing (CN); Li Wang, Beijing (CN); Jianchao Zhu, Beijing (CN); Libin Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/038,690

(22) PCT Filed: Nov. 30, 2020

(86) PCT No.: PCT/CN2020/132946

§ 371 (c)(1),
(2) Date: May 24, 2023

(87) PCT Pub. No.: WO2022/110220

PCT Pub. Date: Jun. 2, 2022

(65) Prior Publication Data

US 2024/0038167 A1 Feb. 1, 2024

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0852* (2013.01); *G09G 2310/061* (2013.01); *G09G 2320/0247* (2013.01); *G09G 2330/021* (2013.01)

(58) Field of Classification Search
CPC ............... G09G 3/3233; G09G 3/3291; G09G 2300/0852; G09G 2310/061; G09G 2320/0247; G09G 2330/021; G09G 3/32
See application file for complete search history.

(56) References Cited

U.S. PATENT DOCUMENTS

2017/0249898 A1* 8/2017 Ma ....................... G09G 3/3233
2020/0184893 A1* 6/2020 Dong ................... G09G 3/3233
2022/0358879 A1 11/2022 Wang et al.

FOREIGN PATENT DOCUMENTS

CN 111754938 A 10/2020

OTHER PUBLICATIONS

CN202080003110.7 second office action.

* cited by examiner

*Primary Examiner* — Abhishek Sarma
(74) *Attorney, Agent, or Firm* — IPro, PLLC

(57) ABSTRACT

Provided are a pixel circuit and a driving method therefor, and a display apparatus. The pixel circuit includes a drive transistor, a reset circuit, a data writing circuit, a storage capacitor circuit, a threshold value compensation circuit, a conduction control circuit, a light-emitting control circuit, and a light-emitting device; the conduction control circuit is configured to: conduct the threshold value compensation circuit with the gate of the drive transistor, and conduct the reset circuit with the gate of the drive transistor at the reset stage, the threshold value detecting stage and the data writing stage; and cut off a conducting state of the threshold value compensation circuit with the gate of the drive transistor, and cut off a conducting state of the reset circuit with the gate of the drive transistor at the driving stage; where the conduction control circuit includes an oxide semiconductor thin film transistor.

20 Claims, 7 Drawing Sheets

PIXEL CIRCUIT AND DRIVING METHOD THEREFOR, AND DISPLAY APPARATUS

CROSS REFERENCE TO RELATED APPLICATIONS

The present disclosure is a National Stage of International Application No. PCT/CN2020/132946, filed Nov. 30, 2020, which is hereby incorporated by reference in its entirety.

TECHNICAL FIELD

The present disclosure relates to the technical field of display, in particular to a pixel circuit and a driving method therefor, and a display apparatus.

BACKGROUND

With the development of an active matrix organic light emitting diode (AMOLED) technology, some mobile display applications not only require a high frame frequency and eliminate motion image trail during dynamic image display; and on the other hand, some mobile display applications also hope to reduce circuit corresponding power consumption by reducing a frame frequency and a data refreshing rate during displaying an unchanged static image within a period of time. A low frame frequency means that at a longer frame period drive stage, a pixel circuit needs to better maintain the stability of a drive control signal, namely, a high voltage holding ratio (VHR), otherwise, an unstable signal and a fluctuant display brightness are prone to causing a blinking phenomenon.

SUMMARY

An embodiment of the present disclosure provides a pixel circuit, including: a drive transistor, a reset circuit, a data writing circuit, a storage capacitor circuit, a threshold value compensation circuit, a conduction control circuit, a light-emitting control circuit, and a light-emitting device;

- the reset circuit is configured to reset the storage capacitor circuit, a gate of the drive transistor and a first electrode of the light-emitting device at a reset stage;
- the threshold value compensation circuit is configured to write a threshold value voltage of the drive transistor into the storage capacitor circuit at a threshold value detecting stage;
- the data writing circuit is configured to write a data voltage into the storage capacitor circuit at a data writing stage;
- the storage capacitor circuit is configured to provide a drive voltage generated by superposition of the data voltage and the threshold value voltage for the gate of the drive transistor at a driving stage;
- the light-emitting control circuit is configured to conduct a first electrode of the drive transistor and the first electrode of the light-emitting device at the driving stage to drive the light-emitting device to emit light; and
- the conduction control circuit is configured to conduct the threshold value compensation circuit with the gate of the drive transistor, and conduct the reset circuit with the gate of the drive transistor at the reset stage, the threshold value detecting stage and the data writing stage; and cut off a conducting state of the threshold value compensation circuit with the gate of the drive transistor, and cut off a conducting state of the reset circuit with the gate of the drive transistor at the driving stage; and the conduction control circuit includes an oxide semiconductor thin film transistor.

In some embodiments, each of the drive transistor, the reset circuit, the data writing circuit, the threshold value compensation circuit and the light-emitting control circuit includes a low-temperature polycrystalline silicon thin film transistor.

In some embodiments, the storage capacitor circuit includes: a first capacitor and a second capacitor;

- one end of the first capacitor is electrically connected with the gate of the drive transistor, and the other end of the first capacitor is electrically connected with one end of the second capacitor, the data writing circuit and the reset circuit; and the other end of the second capacitor is electrically connected with a first reference voltage signal end;
- where the one end of the first capacitor connected with the gate of the drive transistor serves as a first node; the other end of the first capacitor connected with the one end of the second capacitor serves as a second node.

In some embodiments, the conduction control circuit includes: a first oxide thin film transistor; and

- a gate of the first oxide thin film transistor is electrically connected with a conduction control signal end, a first electrode of the first oxide thin film transistor is electrically connected with a first node, and a second electrode of the first oxide thin film transistor is electrically connected with the reset circuit and the threshold value compensation circuit respectively.

In some embodiments, the conduction control circuit further includes: a second oxide thin film transistor; and

- a gate of the second oxide thin film transistor is electrically connected with the conduction control signal end, a first electrode of the second oxide thin film transistor is electrically connected with a second node, and a second electrode of the second oxide thin film transistor is electrically connected with the data writing circuit and the reset circuit respectively.

In some embodiments, the storage capacitor circuit includes: a third capacitor and a fourth capacitor;

- one end of the third capacitor is electrically connected with the gate of the drive transistor, one end of the fourth capacitor respectively, and the other end of the third capacitor is electrically connected with a first reference voltage signal end; and
- the other end of the fourth capacitor is electrically connected with the data writing circuit and the reset circuit respectively;
- where the one end of the third capacitor connected with the gate of the drive transistor serves as a first node; and the other end of the fourth capacitor connected with the data writing circuit and the reset circuit serves as a second node.

In some embodiments, the conduction control circuit includes: a third oxide thin film transistor; and

- a gate of the third oxide thin film transistor is electrically connected with the conduction control signal end, a first electrode of the third oxide thin film transistor is electrically connected with the first node, and a second electrode of the third oxide thin film transistor is electrically connected with the one end of the fourth capacitor, the reset circuit and the threshold value compensation circuit respectively.

In some embodiments, the data writing circuit includes: a first transistor, a gate of the first transistor is electrically connected with a first scanning signal end, a first electrode of the first transistor is electrically connected with a data voltage signal end, and a second electrode of the first transistor is electrically connected with the second node.

In some embodiments, the threshold value compensation circuit includes: a second transistor, a gate of the second transistor is electrically connected with a second scanning signal end, a first electrode of the second transistor is electrically connected with the first electrode of the drive transistor, and a second electrode of the second transistor is electrically connected with the first node through the conduction control circuit.

In some embodiments, the reset circuit includes: a third transistor, a fourth transistor and a fifth transistor;

a gate of the third transistor and a gate of the fourth transistor are electrically connected with the reset signal end respectively, a first electrode of the third transistor and a first electrode of the fourth transistor are electrically connected with an initialized signal end respectively, a second electrode of the third transistor is electrically connected with the first node through the conduction control circuit, and a second electrode of the fourth transistor is electrically connected with the first electrode of the light-emitting device; and a gate of the fifth transistor is electrically connected with the second scanning signal end of the precious pixel row, a first electrode of the fifth transistor is electrically connected with a second reference voltage signal end, and a second electrode of the fifth transistor is electrically connected with a second node.

In some embodiments, the light-emitting control circuit includes: a sixth transistor, a gate of the sixth transistor is electrically connected with a light-emitting control signal end, a first electrode of the sixth transistor is electrically connected with the first electrode of the drive transistor, and a second electrode of the sixth transistor is electrically connected with the first electrode of the light-emitting device; and the second electrode of the drive transistor is electrically connected with a first power signal end, and the second electrode of the light-emitting device is electrically connected with a second power signal end.

In some embodiments, the sixth transistor is a P-type transistor, and the light-emitting control signal end and the conduction control signal end are a same signal end.

In another aspect, an embodiment of the present disclosure further provides a driving method for the above pixel circuit provided by the embodiment of the present disclosure, including:

at a reset stage, conducting, by a conduction control circuit, a reset circuit and a gate of a drive transistor, and resetting, by the reset circuit, a storage capacitor circuit, the gate of the drive transistor and a first electrode of a light-emitting device;

at a threshold value detecting stage, conducting, by the conduction control circuit, a threshold value compensation circuit and the gate of the drive transistor, and writing, by the threshold value compensation circuit, a threshold voltage of the drive transistor into a storage capacitor circuit;

at a data writing stage, writing, by a data writing circuit, a data voltage into the storage capacitor circuit; and at a driving stage, cutting off, by the conduction control circuit, a conducting state of the threshold value compensation circuit and the reset circuit respectively with the gate of the drive transistor, and conducting, by a light-emitting control circuit, a first electrode of the drive transistor and the first electrode of the light-emitting device to drive the light-emitting device to emit light; where the reset stage, the threshold value detecting stage, the data writing stage and the driving stage sequentially and continuously form a display frame time period.

In another aspect, an embodiment of the present disclosure further provides a display apparatus, including the above pixel circuit provided by the embodiment of the present disclosure.

DETAILED DESCRIPTION

Figure 1A:
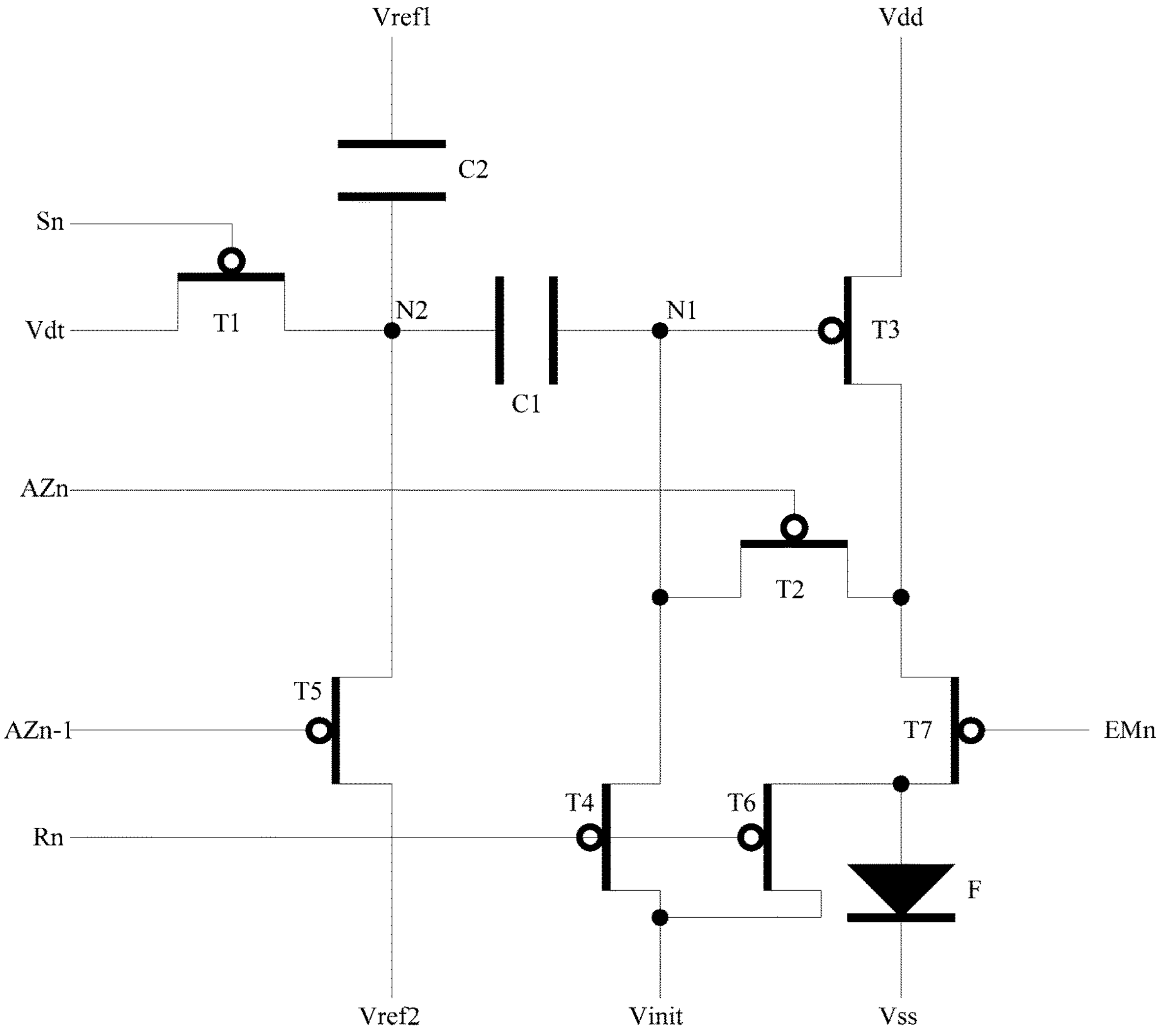
FIG. 1A is a schematic circuit diagram of a pixel circuit in the related art.

Due to non-uniformity of spatial variation of a threshold voltage (Vth) of a low-temperature polycrystalline silicon thin film transistor (LTPS TFT), a pixel circuit of an active matrix organic light emitting diode (AMOLED) adopting the LTPS TFT needs to compensate the non-uniformity of the Vth of a drive TFT (DTFT). A work frame period of a voltage type Vth compensation pixel circuit may be divided into several processes, one process is a Vth detecting process, the detecting precision directly affects the compensation precision, and it usually needs longer time for achieving the high-precision Vth detecting process; the other process is a display data signal (Vdt) frame data refreshing process, the process takes less time than the Vth detecting process; after the Vth detecting and Vdt signal data refreshing, Vdt signal and Vth compensation signal superposition (programming) is achieved through a switch TFT (STFT) state switching transient process; and a superposed signal controls the DTFT to output a drive current of a pixel OLED. Since time is relatively longer at an OLED driving stage, holding of a drive control signal at the stage is prone to being affected by accumulation of micro interference. In addition, in order to ensure that a related signal processing process is not affected by a signal of an image of a previous frame remaining in a signal holding capacitor Cst, the pixel circuit further needs a reset process to eliminate a related residual signal of the previous frame.

Based on the consideration of pixel circuit conciseness and layout efficiency, existing mass-produced mainstream pixel circuit timing sequence solutions all trend to synchronously perform Vth detecting and Vdt refreshing. However, since Vth detecting and Vdt refreshing synchronously happen, in a matrix addressing structure of Vdt time sharing occupying a data line for scanning and refreshing, the process may be limited by a scanning line period. It is found through analysis that on the premise of good resetting, the Vth detecting precision is mainly determined by a Cst charging ratio in a detecting process, and a sufficient detecting period (namely charging time) is a necessary precondition for achieving a high charging ratio. With the improvement of a product resolution ratio and a shortened line period, charging time of the pixel circuit of the Vth detecting process synchronously performed with Vdt refreshing is inhibited, and degradation of the charging ratio affects the Vth detecting and compensation precision.

One of the ways to improve the Vth detecting charging ratio is to separate the Vth detecting process from the Vdt refreshing process. The independent Vth detecting process is not limited by the line period, and a relatively ideal Cst charging ratio and the Vth detecting precision may be achieved by lengthening the detecting process; in another aspect, since it takes far shorter time for Vdt refreshing than the Vth detecting process, Vdt refreshing process separation is also beneficial for improving a data line utilization efficiency, so as to achieve a high resolution ratio or a high frame frequency. A work timing sequence characteristic of a related circuit is that first, the Vth detecting process is separately started, after the process is completed, a Vth signal is maintained, then Vdt refreshing is started, and signal superposition is performed synchronous with refreshing or after refreshing is finished; or Vdt refreshing and temporary storage may also be adopted first, then the Vth detecting process is started, and when detecting is finished, superposition with a temporarily stored Vdt signal is performed.

This type of pixel circuit through separating the Vth detecting process from the Vdt refreshing process is suitable for achieving high-quality Vth compensation under a high frame frequency. On the circuit structure characteristic, Vth holding and Vdt temporary storage of this type of circuit usually need a standalone capacitor respectively, so that the separated Vdt refreshing process and Vth detecting process cannot be restricted by each other. Then, parallel or series connection coupling of two capacitors achieves Vth and Vdt signal superposition, forms a drive control signal of the pixel OLED and maintains a period of a frame.

Since an equivalent capacitor in the pixel circuit for signal holding is usually a capacitor network formed by multiple capacitor coupling or related to multiple capacitor coupling, and a plurality of electric leakage nodes may be in the capacitor network and affect the stability of signal holding; and in addition, for the capacitor network formed after multiple capacitor coupling, starting with the driving stage, a capacity of the equivalent capacitor with a signal holding function is usually not larger than a capacity of a certain capacitor. More electric leakage nodes and electric leakage and smaller valid electric capacity cause poor stability of the OLED drive control signal holding of a long-frame period at the driving stage, which enables this type of circuit to be more unsuitable for a low-frame-frequency application.

Figure 1B:
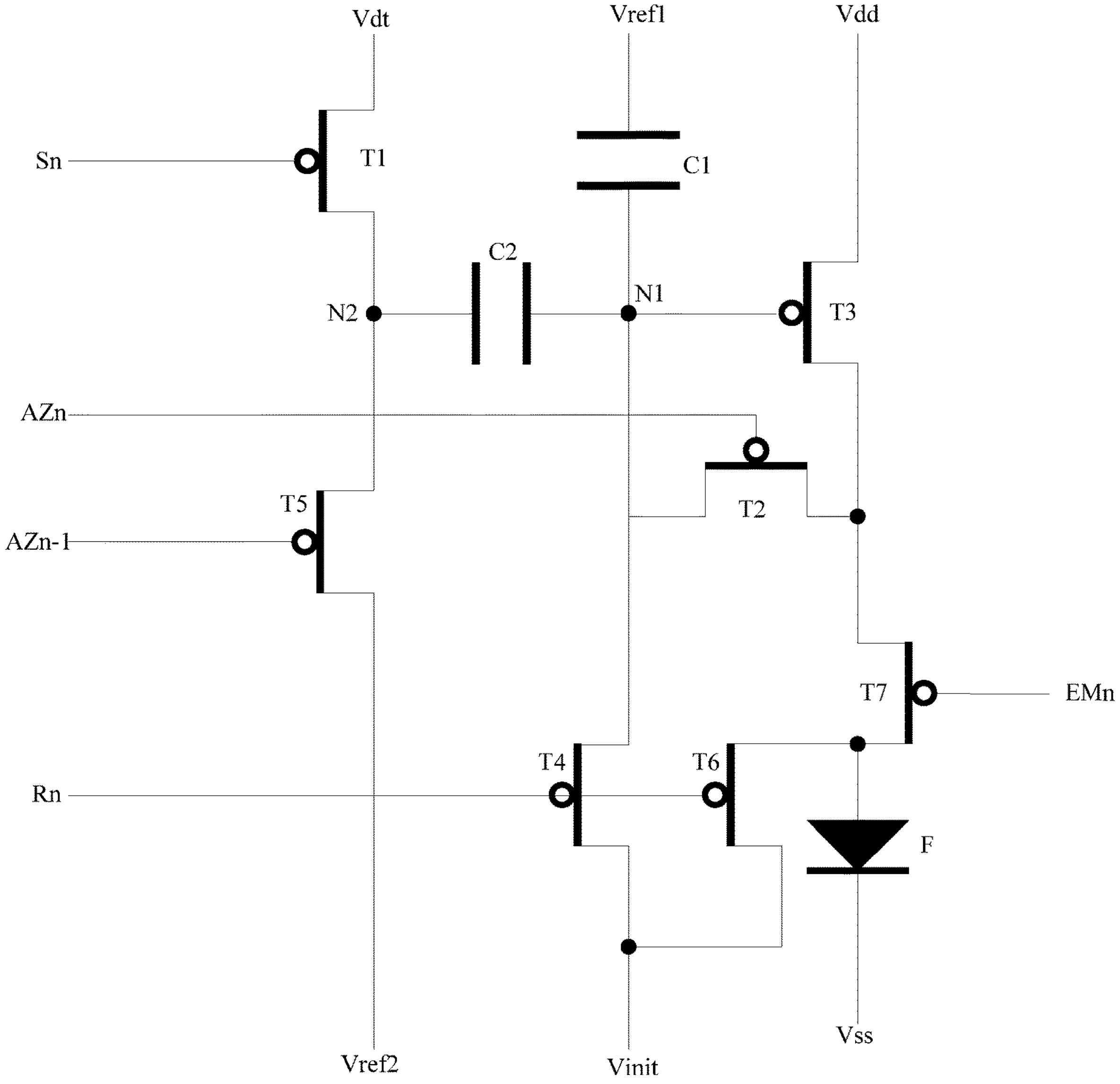
FIG. 1B is another schematic circuit diagram of a pixel circuit in the related art.

Taking the pixel circuit with the Vth detecting process and the Vdt refreshing process being separated shown in FIG. 1A and FIG. 1B as an example, a Vth and Vdt parallel-connection coupled circuit is shown in FIG. 1B, at a driving stage after coupling, a node N2 at a coupled signal reference end floats in the air, a capacitor C2 does not contribute to a node N1 signal holding, the capacitor network only holds a control signal of T3 at the node N1 with a capacity of a single capacitor C1, however, an electric leakage effect at the floating node N2 of the coupled capacitor network may be coupled to the node N1 through the capacitor C2, to together affect the node N1 to hold the stability of a potential with an electric leakage at the node N1. A Vth and Vdt series-connection coupled circuit is shown in FIG. 1A, at the driving stage, a control signal of T3 is held at the node N1 by a series-connection capacitor (smaller capacity) of the capacitors C1 and C2, and the electric leakage of the two nodes N1 and N2 of the series-connection capacitor networks directly affects the stability of signal holding of the node N1.

Considering from a circuit principle, the circuit with the Vth detecting process and the Vdt refreshing process being separated is adopted to achieve a high charging ratio and a high detecting precision of Vth detecting and ensure the high-frame-frequency characteristic. Since a double-capacitor coupled mechanism is usually included in the circuit, the capacity of the equivalent capacitor of the signal holding capacitor network at the driving stage is usually not larger than that of one capacitor, more electric leakage nodes and electric leakage closed circuits having adverse impacts on signal holding further exist, and there are many opportunities for electric leakage. If the circuit is required to have the low-frame-frequency characteristic, in addition to directly using a low-electric-leakage device as a closed circuit switch device, the number of related electric leakage nodes and electric leakage closed circuits affecting capacitor network signal holding is also tried to be reduced.

As for an LTPO technology in the pixel circuit basically formed by LTPS devices, part of oxide semiconductor TFTs (OxTFTs) with a low electric leakage are adopted to replace an LTPS TFT with a larger electric leakage to serve as an STFT of an electric-leakage sensitive switch closed circuit, electric leakage of related nodes may be effectively reduced, and a voltage holding ratio of a capacitor network holding signal is improved, so that the pixel circuit may work in a low-frame-frequency state. If the T2, T4, T1 and T5 in FIG. 1A and FIG. 1B adopt the low-electric-leakage OxTFT, the voltage holding ratio of the T3 drive control signal held at the node N1 at the driving stage may be obviously improved.

However, at present, the OxTFT usually occupies a larger area, excessive adopting of the OxTFTs causes the pixel circuit to need a larger layout area, and the process implementation burden is increased. By the pixel circuit provided by an embodiment of the present disclosure on the basis of ensuring that Vth detecting and Vdt refreshing process separation is suitable for high-frame-frequency application, through a structure transformation of the pixel circuit, the number of the electric leakage nodes and related electric leakage closed circuits affecting the capacitor network signal holding at the driving stage is reduced, so that the pixel circuit is more suitable for adopting few low-electric-leakage OxTFT devices to inhibit adverse electric leakage, to ensure the voltage holding ratio of the capacitor network and give consideration to the low-frame-frequency characteristic.

In order to make objectives, technical solutions and advantages of the present disclosure clearer, the present disclosure will further be described in detail below with reference to the accompanying drawings. Apparently, the described embodiments are some, but not all, embodiments of the present disclosure. Based on the embodiments in the present disclosure, all other embodiments obtained by those of ordinary skill in the art without creative work shall fall within the protection scope of the present disclosure.

Shapes and sizes of all components in the accompanying drawings do not reflect true scales, and are only intended to schematically illustrate the content of the present disclosure.

Figure 2:
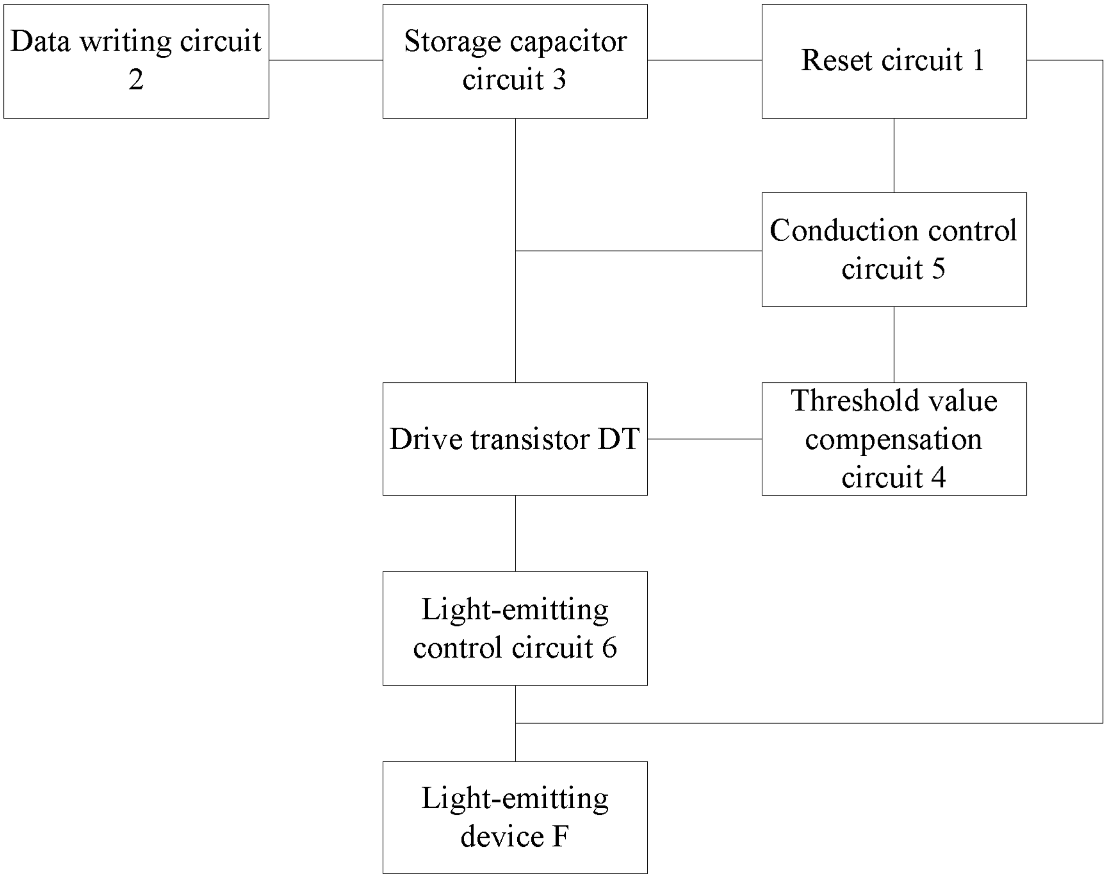
FIG. 2 is a schematic block diagram of a pixel circuit provided by an embodiment of the present disclosure.

An embodiment of the present disclosure provides a pixel circuit, as shown in FIG. 2, including: a drive transistor DT, a reset circuit 1, a data writing circuit 2, a storage capacitor circuit 3, a threshold value compensation circuit 4, a conduction control circuit 5, a light-emitting control circuit 6, and a light-emitting device F;

the reset circuit 1 is configured to reset the storage capacitor circuit 3, a gate of the drive transistor DT and a first electrode of the light-emitting device F at a reset stage t1;

the threshold value compensation circuit 4 is configured to write a threshold voltage of the drive transistor DT into the storage capacitor circuit 3 at a threshold value detecting stage t2;

the data writing circuit 2 is configured to write a data voltage into the storage capacitor circuit 3 at a data writing stage t3;

the storage capacitor circuit 3 is configured to provide a drive voltage generated by superposition of the data voltage and the threshold voltage for the gate of the drive transistor DT at a driving stage t4;

the light-emitting control circuit 6 is configured to conduct a first electrode of the drive transistor DT and the first electrode of the light-emitting device F at the driving stage t4 to drive the light-emitting device F to emit light; and the conduction control circuit 5 is configured to conduct the threshold value compensation circuit 4 and the reset circuit 1 respectively with the gate of the drive transistor DT at the reset stage t1, the threshold value detecting stage t2 and the data writing stage t3, and cut off a conducting state of the threshold value compensation circuit 4 and the reset circuit 1 respectively with the gate of the drive transistor DT at the driving stage t4; where the conduction control circuit 5 includes an oxide semiconductor thin film transistor (OxTFT).

In some embodiments, on the basis of ensuring that the threshold value detecting stage and the data writing stage are separated to be suitable for high-frame-frequency application, by transforming a circuit structure, the threshold value compensation circuit 4 and the drive transistor DT as well as the reset circuit 1 and the drive transistor DT are connected through the conduction control circuit 5 containing the low-electric-leakage oxide semiconductor thin film transistor (OxTFT), the added conduction control circuit 5 may reduce electric leakage nodes and related electric leakage closed circuits, which have an effect when the storage capacitor circuit 3 continuously provides a drive voltage for the a gate of the drive transistor DT, in the pixel circuit, a small number of the low-electric-leakage oxide semiconductor thin film transistors (OxTFTs) are used as closed circuit switch devices to inhibit the impact of a leakage current on the storage capacitor circuit 3 holding the stability of a drive voltage signal, and ensure a voltage holding ratio of a drive signal, thereby giving consideration to a low-frame-frequency application.

The present disclosure is explained in detail below by combining with specific embodiments. It needs to be explained that the embodiments are intended to better explain the present disclosure, but not limit the present disclosure.

Figure 3A:
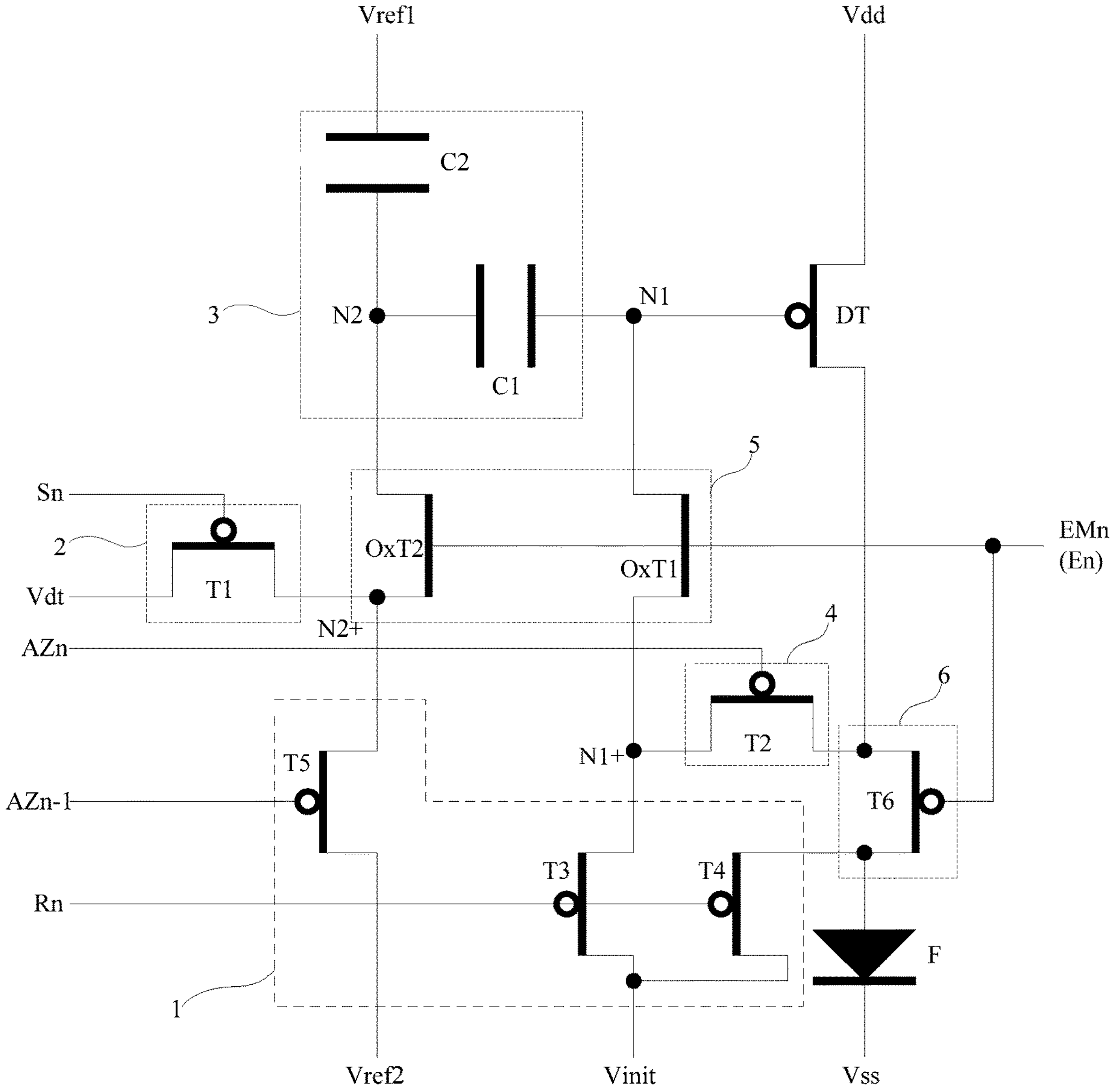
FIG. 3A is a schematic circuit diagram of a pixel circuit provided by an embodiment of the present disclosure.
Figure 3B:
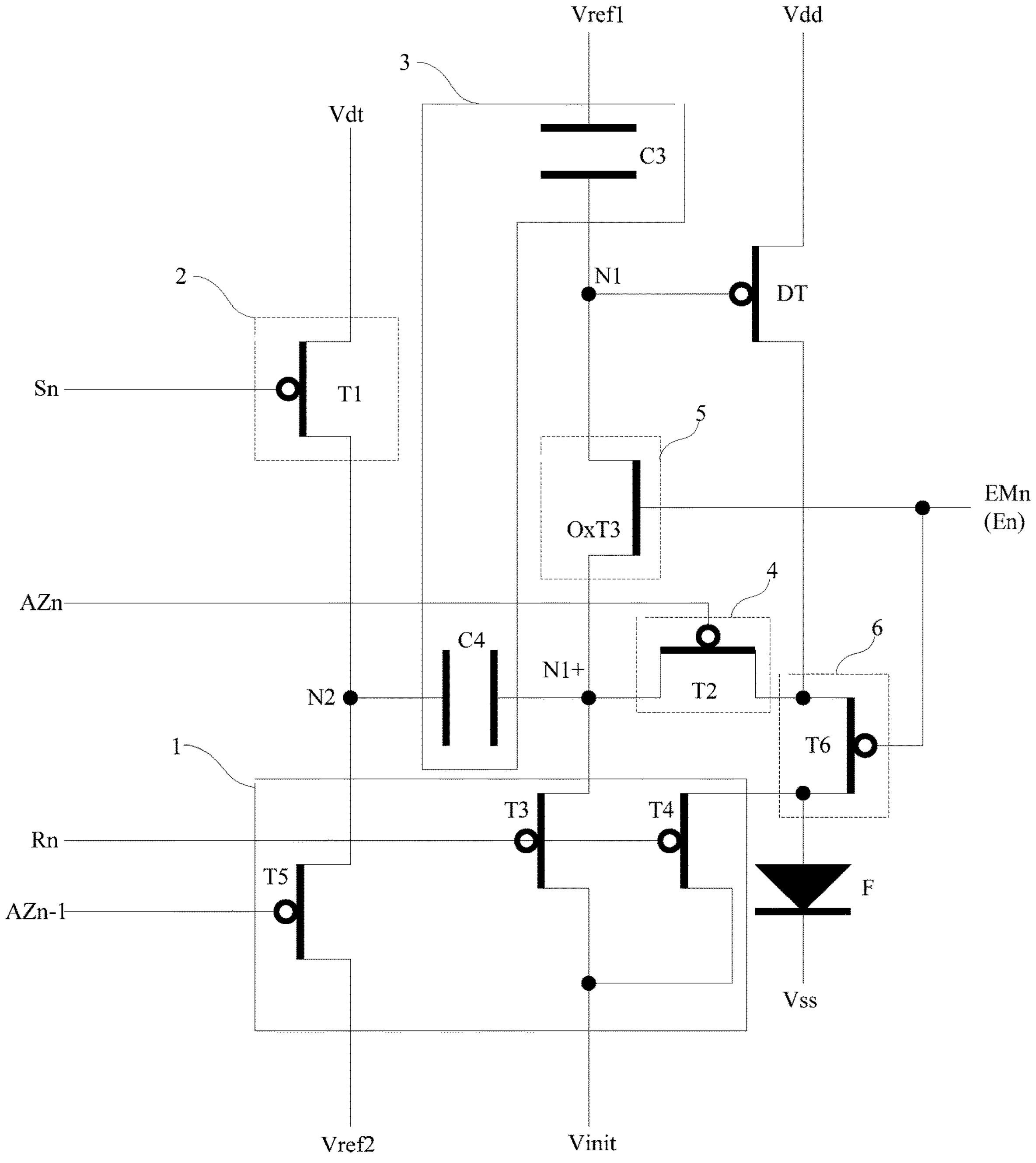
FIG. 3B is another schematic circuit diagram of a pixel circuit provided by an embodiment of the present disclosure.

In some embodiments, as shown in FIG. 3A and FIG. 3B, the drive transistor DT may be set as a P-type transistor. Certainly, the drive transistor DT may also be set as an N-type transistor, which is not limited here.

In some embodiments, the P-type transistor is cut off under the action of a high-level signal, and is conducted under the action of a low-level signal; and the N-type transistor is conducted under the action of a high-level signal, and is cut off under the action of a low-level signal.

In some embodiments, as shown in FIG. 3A and FIG. 3B, the drive transistor DT, the reset circuit 1, the data writing circuit 2, the threshold value compensation circuit 4 and the light-emitting control circuit 6 all include low-temperature polycrystalline silicon thin film transistors T, a layout area occupied by the low-temperature polycrystalline silicon thin film transistors T is smaller, which is beneficial for a minitype integrated design of the pixel circuit.

In some embodiments, signals loaded at signal ends connected with the low-temperature polycrystalline silicon thin film transistors T are different, a first electrode may be used as a source electrode or a drain electrode, and a second electrode may be used as a drain electrode or a source electrode, which is not limited here.

In some embodiments, as shown in FIG. 3A, the storage capacitor circuit 3 may include: a first capacitor C1 and a second capacitor C2, and the first capacitor C1 and the second capacitor C2 form a series-connection coupled capacitor network; and one end of the first capacitor C1 may serve as a first node N1 to be electrically connected with the gate of the drive transistor DT, and the other end of the first capacitor C1 may serve as a second node N2 to be electrically connected with one end of the second capacitor C2, the data writing circuit 2 and the reset circuit 1; and the other end of the second capacitor C2 is electrically connected with a first reference voltage signal end Vref1.

In some embodiments, at the driving stage t4, the electric leakage of the first node N1 and the second node N2 may directly affect signal holding of the coupled capacitor network. In some embodiments, the first node N1 is connected with four closed circuits, including that the first capacitor C1 and the gate of the drive transistor DT connected with the first node N1 form a part of the signal holding capacitor network; and a closed circuit of the threshold value compensation circuit 4 and the reset circuit 1 connected with the first node N1 works only at the reset stage t1 and the threshold value detecting stage t2, a closed circuit of the threshold value compensation circuit 4 and the reset circuit 1 at the driving stage t4 is cut off, but its electric leakage may have an adverse impact on the signal holding network between the first capacitor C1 and the gate of the drive transistor DT through the first node N1.

Therefore, in order to solve the impacts of electric leakage of a closed circuit working at a non-driving stage on the signal holding network at the driving stage, the present disclosure may divide the first node N1 into a node N1 and a node N1+; and after division, the first node N1 is connected with the first capacitor C1 and the gate of the drive transistor DT working at the driving stage t4, the node N1+ is connected with the threshold value compensation circuit 4 and the reset circuit 1 working at other stages, and the node N1 is connected with the node N1+ through a low-electric-leakage oxide thin film transistor. Optionally, in the above pixel circuit provided by the embodiment of the present disclosure, as shown in FIG. 3A, the conduction control circuit 5 may include: the first oxide thin film transistor OxT1; and a gate of the first oxide thin film transistor OxT1 is electrically connected with a conduction control signal end En, a first electrode of the first oxide thin film transistor OxT1 is electrically connected with the first node N1, and a second electrode of the first oxide thin film transistor OxT1 is electrically connected with the reset circuit 1 and the threshold value compensation circuit 4.

In some embodiments, at the reset stage t1, the threshold value detecting stage t2 and the data writing stage t3, the conduction control signal end En may control the first oxide thin film transistor OxT1 to be conducted, so as to support the threshold value compensation circuit 4 and the reset circuit 1 to take part in the related resetting and threshold value detecting processes of the first node N1 through the node N1+; and at the driving stage t4, the conduction control signal end En may control the first oxide thin film transistor OxT1 to be cut off, and inhibit the impact of electric leakage of the threshold value compensation circuit 4 and the reset circuit 1 connected with the node N1+ on capacitor network signal holding.

Based on the similar analysis, the present disclosure may also divide the second node N2 into a node N2 and a node N2+, and the node N2 is connected with the node N2+ through a low-electric-leakage oxide thin film transistor. In some embodiments, as shown in FIG. 3A, the conduction control circuit 5 may further include: a second oxide thin film transistor OxT2; and a gate of the second oxide thin film transistor OxT2 is electrically connected with the conduction control signal end En, a first electrode of the second oxide thin film transistor OxT2 is electrically connected with the second node N2, and a second electrode of the second oxide thin film transistor OxT2 is electrically connected with the data writing circuit 2 and the reset circuit 1.

In some embodiments, at the reset stage t1, the threshold value detecting stage t2 and the data writing stage t3, the conduction control signal end En may control the second oxide thin film transistor OxT2 to be conducted, so as to support the data writing circuit 2 and the reset circuit 1 to take part in related working processes of the second node N2 through the node N2+, including that a data signal is injected into the second capacitor C2 and held through the second node N2, and is in coupled superposition with a threshold voltage in the first capacitor C1; and at the driving stage t4, the conduction control signal end En may control the second oxide thin film transistor OxT2 to be cut off, and inhibit the impact of electric leakage of the data writing circuit 2 and the reset circuit 1 connected with the node N2+ on capacitor network signal holding.

The above circuit provided by the embodiment of the present disclosure may inhibit the adverse impact, on capacitor network signal holding, of electric leakage of the low-temperature polycrystalline silicon thin film transistors in the reset circuit 1, the data writing circuit 2 and the threshold value compensation circuit 4 in the pixel circuit by only adding two low-electric-leakage oxide thin film transistors.

In some embodiments, as shown in FIG. 3B, the storage capacitor circuit 3 may include: a third capacitor C3 and a fourth capacitor C4, and the third capacitor C3 and the fourth capacitor C4 form a parallel-connection coupled capacitor network; and one end of the third capacitor C3 may serve as the first node N1 to be electrically connected with the gate of the drive transistor DT and one end of the fourth capacitor C4 respectively, and other end is electrically connected with the first reference voltage signal end Vref1; and the other end of the fourth capacitor C4 may serve as the second node N2 to be electrically connected with the data writing circuit 2 and the reset circuit 1 respectively.

In some embodiments, at the driving stage t4, the electric leakage of the first node N1 in the coupled capacitor network has a direct impact on signal holding of the coupled capacitor network, and the electric leakage impact of the second node N2 is indirect by being coupled to the first node N1 through the fourth capacitor C4. In some embodiments, the first node N1 is connected with five closed circuits, including that the third capacitor C3 and the gate of the drive transistor DT connected with the first node N1 form a part of the signal holding capacitor network; and closed circuits of the fourth capacitor C4, the threshold value compensation circuit 4 and the reset circuit 1 connected with the first node N1 do not have a set function at the driving stage t4, but their related electric leakage will have an adverse impact on signal holding.

Therefore, in order to solve the impact of the electric leakage of the closed circuit working at a non-driving stage on the signal holding network at the driving stage, the present disclosure may also divide the first node N1 into a node N1 and a node N1+; and after division, the first node N1 is connected with the third capacitor C3 and the gate of the drive transistor DT working at the driving stage t4, the node N1+ is connected with the fourth capacitor C4, the threshold value compensation circuit 4 and the reset circuit 1, and the node N1 is connected with the node N1+ through a low-electric-leakage oxide thin film transistor. Optionally, in the above pixel circuit provided by the embodiment of the present disclosure, as shown in FIG. 3B, the conduction control circuit 5 may include: a third oxide thin film transistor OxT3; and a gate of the third oxide thin film transistor OxT3 is electrically connected with the conduction control signal end En, a first electrode of the third oxide thin film transistor OxT3 is electrically connected with the first node N1, and a second electrode of the third oxide thin film transistor OxT3 is electrically connected with one end of the fourth capacitor c4, the reset circuit 1 and the threshold value compensation circuit 4 respectively.

In some embodiments, at the reset stage t1, the threshold value detecting stage t2 and the data writing stage t3, the conduction control signal end En may control the third oxide thin film transistor OxT3 to be conducted, so as to support the threshold value compensation circuit 4 and the reset circuit 1 to take part in the related resetting and threshold value detecting processes of the first node N1 through the node N1+, and then a data signal provided by the data writing circuit 2 is coupled to the first node N1 through the fourth capacitor C4 and the node N1+ to form a superposed signal of the threshold value voltage and the data voltage; and at the driving stage t4, the conduction control signal end En may control the third oxide thin film transistor OxT3 to be cut off, and not only inhibit the impact, on capacitor network signal holding, of electric leakage of the threshold value compensation circuit 4 and the reset circuit 1 connected with the node N1+, and also inhibit the adverse impact of electric leakage of the data writing circuit 2 and the reset circuit 1 connected with the second node N2 by being coupled to the node N1+ through the fourth capacitor C4.

The above circuit provided by the embodiment of the present disclosure may inhibit the adverse impact, on capacitor network signal holding, of electric leakage of the low-temperature polycrystalline silicon thin film transistors in the reset circuit 1, the data writing circuit 2 and the threshold value compensation circuit 4 in the pixel circuit by only adding one low-electric-leakage oxide thin film transistor.

In some embodiments, as shown in FIG. 3A and FIG. 3B, the data writing circuit 2 may s include: a first transistor T1, a gate of the first transistor T1 is electrically connected with a first scanning signal end Sn, a first electrode of the first transistor T1 is electrically connected with a data voltage signal end Vdt, and a second electrode of the first transistor T1 is electrically connected with the second node N2.

In some embodiments, the first transistor T1 is in a conducting state at the data writing stage t3 under the signal control of the first scanning signal end Sn, and on the basis of the oxide thin film transistor contained in the conduction control circuit 5 being in the conducting state, the data voltage and the threshold voltage are superposed and loaded to the first node N1.

In some embodiments, as shown in FIG. 3A and FIG. 3B, the threshold value compensation circuit 4 may include: a second transistor T2, a gate of the second transistor T2 is electrically connected with a second scanning signal end AZn, a first electrode of the second transistor T2 is electrically connected with the first electrode of the drive transistor DT, and a second electrode of the second transistor T2 is electrically connected with the first node N1 through the conduction control circuit 5.

In some embodiments, the second transistor T2 is in a conducting state at the threshold value detecting stage t2 under the signal control of the second scanning signal end AZn, and on the basis of the oxide thin film transistor included in the conduction control circuit 5 being in the conducting state, the threshold voltage is loaded to the first node N1.

In some embodiments, as shown in FIG. 3A and FIG. 3B, the reset circuit 1 may include: a third transistor T3, a fourth transistor T4 and a fifth transistor T5;

a gate of the third transistor T3 and a gate of the fourth transistor T4 are electrically connected with a reset signal end Rn respectively, a first electrode of the third transistor T3 and a first electrode of the fourth transistor T4 are electrically connected with an initialized signal end Vinit respectively, a second electrode of the third transistor T3 is electrically connected with the first node N1 through the conduction control circuit 5, and a second electrode of the fourth transistor T4 is electrically connected with the first electrode of the light-emitting device F; and a gate of the fifth transistor T5 is electrically connected with the second scanning signal end AZn−1 of a previous pixel row, a first electrode of the fifth transistor T5 is electrically connected with the second reference voltage signal end Vref2, and a second electrode of the fifth transistor T5 is electrically connected with the second node N2.

In some embodiments, the third transistor T3 and the fourth transistor T4 are in a conducting state at the reset stage t1 under the signal control of the reset signal end Rn, and on the basis of the oxide thin film transistor contained in the conduction control circuit 5 being in the conducting state, initialized resetting is performed on the first node N1 and the first electrode of the light-emitting device F. The fifth transistor T5 is in a conducting state at the reset stage t1 under the signal control of the second scanning signal end AZn−1 of the previous pixel row, and basis of the oxide thin film transistor contained in the conduction control circuit 5 being in the conducting state, initialized resetting is performed on the second node N2.

In some embodiments, as shown in FIG. 3A and FIG. 3B, the light-emitting control circuit 6 may include: a sixth transistor T6, a gate of the sixth transistor T6 is electrically connected with a light-emitting control signal end EMn, a first electrode of the sixth transistor T6 is electrically connected with the first electrode of the drive transistor DT, and a second electrode of the sixth transistor T6 is electrically connected with the first electrode of the light-emitting device F; and the second electrode of the drive transistor DT is electrically connected with a first power signal end Vdd, and the second electrode of the light-emitting device F is electrically connected with a second power signal end Vss.

In some embodiments, the sixth transistor T6 is in a conducting state at the driving stage t4 under the signal control of the light-emitting control signal end EMn, conducts the drive transistor DT and the first electrode of the light-emitting device F, and drives the light-emitting device F to emit light.

In some embodiments, the light-emitting device F is generally an organic light-emitting diode, and emits light under the action of an electric current when the drive transistor DT is in a saturated state. In addition, an anode of the organic light-emitting diode is the first electrode of the light-emitting device F, and a cathode is the second electrode of the light-emitting device F.

In some embodiments, a voltage of the second power signal end Vss may be a constant value, such as grounding.

In some embodiments, as shown in FIG. 3A and FIG. 3B, the sixth transistor T6 may be a P-type transistor, a polarity of the oxide semiconductor thin film transistor (OxTFT) being the N-type transistor is opposite to a polarity of the P-type transistor of the sixth transistor T6, switch states of the transistors under the control of the same signal are also opposite, and control timing sequence signals with the same polarity may be shared from the circuit logic, that is, at the moment, the light-emitting control signal end EMn and the conduction control signal end En may be the same signal end, so as to simplify a signal line layout. However, actually, since a property difference and the technical discreteness of the OxTFT and LTPS TFT, the two types of TFTs may have a difference on a threshold voltage. For example, requirements of the OxTFT and LTPS TFT for the control timing sequence signal are respectively −3V to +10V and −7V to +7V, and independent timing sequence signal lines may be respectively adopted for driving due to a level difference, that is, the light-emitting control signal end EMn and the conduction control signal end En respectively adopt independent timing sequence control signals.

The above is only an example to illustrate a specific structure of each circuit in the pixel circuit provided by the embodiment of the present disclosure, the above specific structure is not limited to the above structure provided by the embodiment of the present disclosure, and may further be other structures known by those of skill in the art, which is not limited here.

Figure 4:
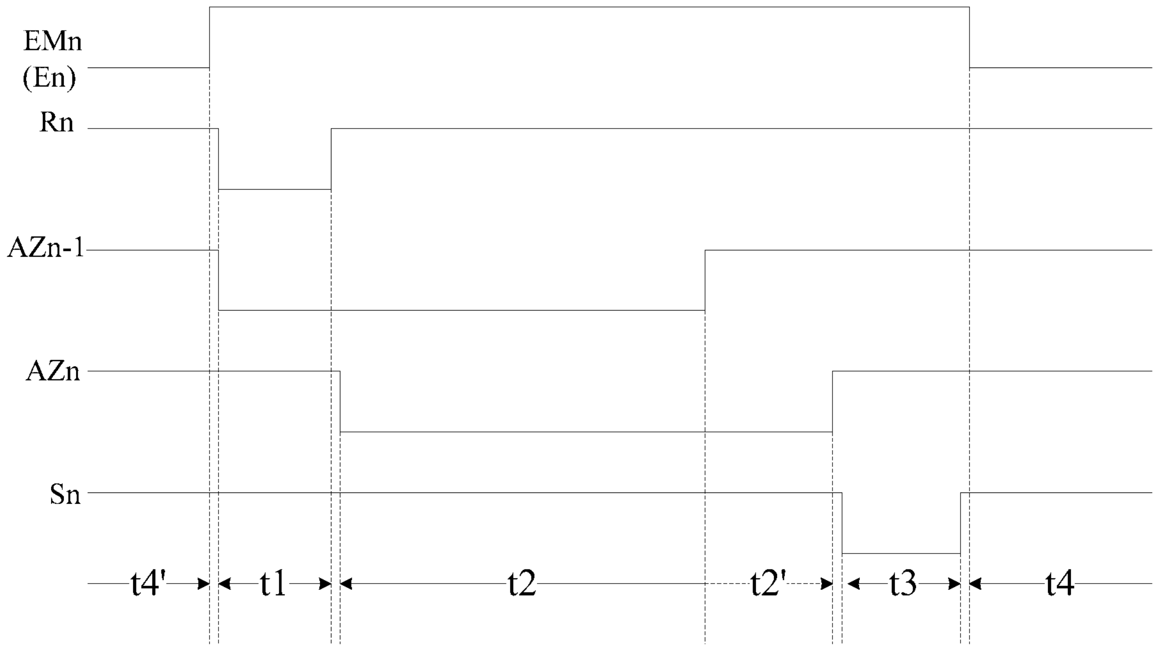
FIG. 4 is a signal timing sequence diagram of a pixel circuit provided by an embodiment of the present disclosure.

The following takes the pixel circuit shown in FIG. 3A as an example and describes a working process of the above pixel circuit provided by the embodiment of the present disclosure in combination with the circuit timing sequence diagram shown in FIG. 4. In some embodiments, the reset stage t1, the threshold value detecting stage t2, the data writing stage t3 and the driving stage t4 in the circuit timing sequence diagram shown in FIG. 4 are selected, where t4' represents a driving stage of the previous display frame time period.

At the reset stage t1, the light-emitting control signal end EMn, the first scanning signal end Sn and the second scanning signal end AZn are all high levels, so that the first transistor T1, the second transistor T2 and the sixth transistor T6 are all cut off, and the first oxide thin film transistor OxT1 and the second oxide thin film transistor OxT2 are all conduced; and the second scanning signal end AZn−1 of a previous pixel row and the reset signal end Rn are all low levels, so that the third transistor T3, the fourth transistor T4 and the fifth transistor T5 are all conducted, the initialized signal end Vinit is respectively written into the first node N1 and the first electrode of the light-emitting device F through the fourth transistor T4 and the fifth transistor T5, so as to reset the first node N1 and the first electrode of the light-emitting device F, and the second reference voltage signal end Vref2 is written into the second node N2 through the third transistor T3, so as to reset the second node N2.

At the threshold value detecting stage t2, the light-emitting control signal end EMn, the first scanning signal end Sn and the reset signal end Rn are all high levels, so that the first transistor T1, the third transistor T3, the fourth transistor T4 and the sixth transistor T6 are all cut off, and the first oxide thin film transistor OxT1 and the second oxide thin film transistor OxT2 are all conducted; and the second scanning signal end AZn−1 of the previous pixel row and the second scanning signal end AZn are all low levels, so that the second transistor T2 and the fifth transistor T5 are all conducted, the second reference voltage signal end Vref2 is written into the second node N2 through the fifth transistor T5, Vdd−Vth is written into the first node N1, Vdd is a voltage of the first power signal end Vdd, and at the moment, a voltage stored in the first capacitor C1 is Vdd−Vth−Vref2. At a t2' stage, the second scanning signal end AZn−1 of the previous pixel row becomes a high level, and the fifth transistor T5 is cut off.

At the data writing stage t3, the light-emitting control signal end EMn, the second scanning signal end AZn, the second scanning signal end AZn−1 of the previous pixel row and the reset signal end Rn are all high levels, so that the second transistor T2, the third transistor T3, the fourth transistor T4, the fifth transistor T5 and the sixth transistor T6 are all cut off, and the first oxide thin film transistor OxT1 and the second oxide thin film transistor OxT2 are all conducted; and the first scanning signal end Sn is a low level, so that the first transistor T1 is conducted, the data voltage signal end Vdt writes the data voltage into the second node N2 through the first transistor T1, at the moment, due to the bootstrapping of the first capacitor C1, a voltage of the first node N1 is raised to Vdd−Vth+Vdt, and the drive transistor DT is conducted.

At the driving stage t4, the first scanning signal end Sn, the second scanning signal end AZn, the second scanning signal end AZn−1 of the previous pixel row and the reset signal end Rn are all high levels, so that the first transistor T1, the second transistor T2, the third transistor T3, the fourth transistor T4 and the fifth transistor T5 are all cut off; and the light-emitting control signal end EMn is a low level, the first oxide thin film transistor OxT1 and the second oxide thin film transistor OxT2 are all cut off, it is ensured that the electric leakage of the node N1+ and the node N2+ cannot affect the first node N1, the sixth transistor T6 is conducted, at the moment, a gate voltage of the drive transistor DT is maintained to be Vdd−Vth+Vdt by the first capacitor C1, the drive transistor DT may control a magnitude of an electric current flowing into the light-emitting device F according to signals including the data voltage Vdt, a threshold voltage Vth of the drive transistor DT and the first power signal end Vdd, and thus control a light-emitting brightness of the light-emitting device F.

The following takes the pixel circuit shown in FIG. 3B as an example and describes the working process of the above pixel circuit provided by the embodiment of the present disclosure in combination with the circuit timing sequence diagram shown in FIG. 4. In some embodiments, the reset stage t1, the threshold value detecting stage t2, the data writing stage t3 and the driving stage t4 in the circuit timing sequence diagram shown in FIG. 4 are selected, where t4' represents a driving stage of the previous display frame time period.

At the reset stage t1, the light-emitting control signal end EMn, the first scanning signal end Sn and the second scanning signal end AZn are all high levels, so that the first transistor T1, the second transistor T2 and the sixth transistor T6 are all cut off, and a third oxide thin film transistor OxT3 is conducted; and the second scanning signal end AZn−1 of the previous pixel row and the reset signal end Rn are all low levels, so that the third transistor T3, the fourth transistor T4 and the fifth transistor T5 are all conducted, the initialized signal end Vinit is respectively written into the first node N1 and the first electrode of the light-emitting device F through the fourth transistor T4 and the fifth transistor T5, so as to reset the first node N1 and the first electrode of the light-emitting device F, and the second reference voltage signal end Vref2 is written into the second node N2 through the third transistor T3, so as to reset the second node N2.

At the threshold value detecting stage t2, the light-emitting control signal end EMn, the first scanning signal end Sn and the reset signal end Rn are all high levels, so that the first transistor T1, the third transistor T3, the fourth transistor T4 and the sixth transistor T6 are all cut off, and the third oxide thin film transistor OxT3 is conducted; and the second scanning signal end AZn−1 of the previous pixel row and the second scanning signal end AZn are all low levels, so that the second transistor T2 and the fifth transistor T5 are all conducted, the second reference voltage signal end Vref2 is written into the second node N2 through the fifth transistor T5, and Vdd−Vth is written into the first node N1, where Vdd is a voltage of the first power signal end Vdd, and at the moment, a voltage stored in the first capacitor C1 is Vdd−Vth-Vref2. At a t2' stage, the second scanning signal end AZn−1 of the previous pixel row becomes a high level, and the fifth transistor T5 is cut off.

At the data writing stage t3, the light-emitting control signal end EMn, the second scanning signal end AZn, the second scanning signal end AZn−1 of the previous pixel row and the reset signal end Rn are all high levels, so that the second transistor T2, the third transistor T3, the fourth transistor T4, the fifth transistor T5 and the sixth transistor T6 are all cut off, and the third oxide thin film transistors OxT3 are conducted; and the first scanning signal end Sn is a low level, so that the first transistor T1 is conducted, the data voltage signal end Vdt writes the data voltage into the second node N2 through the first transistor T1, at the moment, due to the bootstrapping of the first capacitor C1, a voltage of the first node N1 is raised to Vdd−Vth+Vdt, and the drive transistor DT is conducted.

At the driving stage t4, the first scanning signal end Sn, the second scanning signal end AZn, the second scanning signal end AZn−1 of the previous pixel row and the reset signal end Rn are all high levels, so that the first transistor T1, the second transistor T2, the third transistor T3, the fourth transistor T4 and the fifth transistor T5 are all cut off; and the light-emitting control signal end EMn is a low level, the third oxide thin film transistors OxT3 are all cut off, it is ensured that the electric leakage of the node N1+ and the second node N2 cannot affect the first node N1, the sixth transistor T6 is conducted, at the moment, a gate voltage of the drive transistor DT is maintained to be Vdd−Vth+Vdt by the first capacitor C1, the drive transistor DT may control the magnitude of an electric current flowing into the light-emitting device F according to signals including the data voltage Vdt, a threshold voltage Vth of the drive transistor DT and the first power signal end Vdd, and thus control the light-emitting brightness of the light-emitting device F.

Figure 5:
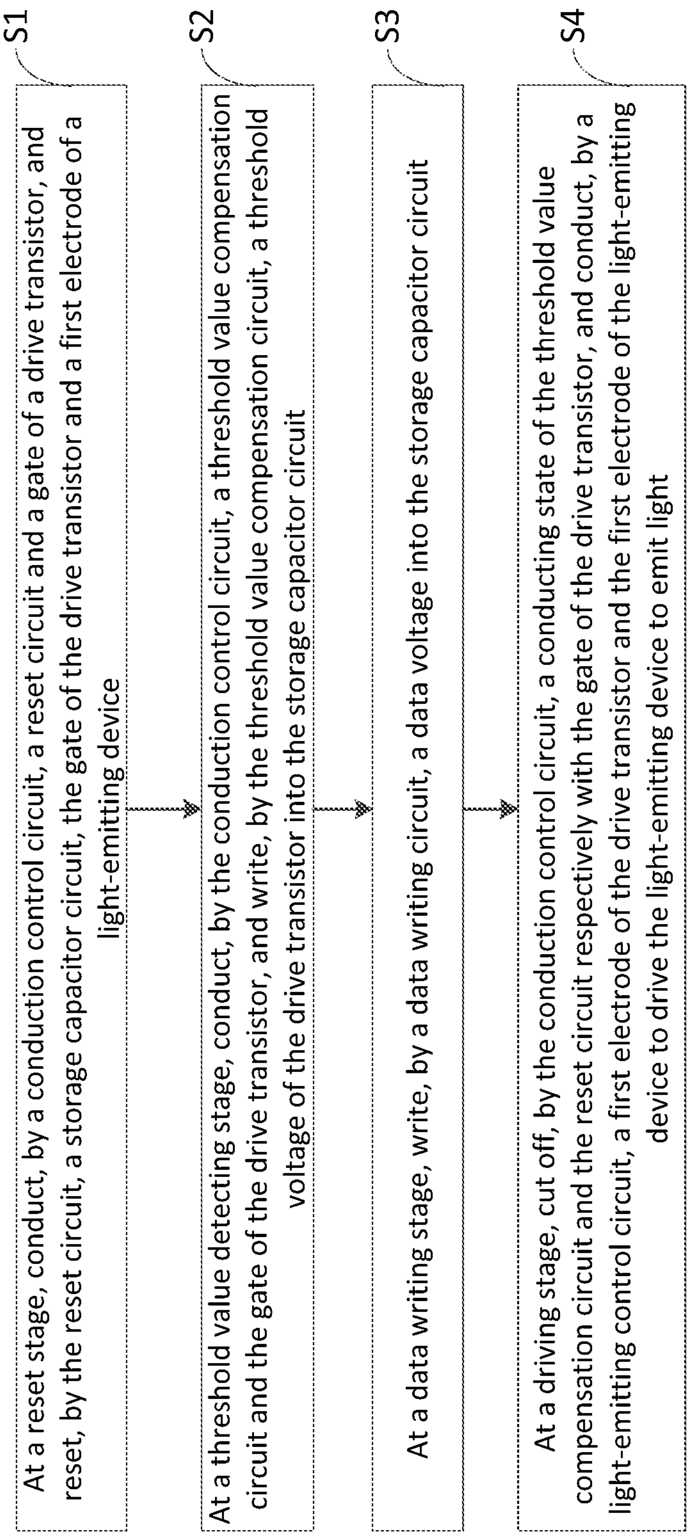
FIG. 5 is a flow diagram of a driving method for a pixel circuit provided by an embodiment of the present disclosure.

Based on the same inventive concept, an embodiment of the present disclosure further provides a driving method for the above pixel circuit, and as shown in FIG. 5, the method may include the following steps:

S1, at a reset stage, a conduction control circuit conducts a reset circuit and a gate of a drive transistor, and the reset circuit resets a storage capacitor circuit, the gate of the drive transistor and a first electrode of a light-emitting device;

S2, at a threshold value detecting stage, the conduction control circuit conducts a threshold value compensation circuit and the gate of the drive transistor, and the threshold value compensation circuit writes a threshold voltage of the drive transistor into the storage capacitor circuit;

S3, at a data writing stage, a data writing circuit writes a data voltage into the storage capacitor circuit; and S4, at a driving stage, the conduction control circuit cuts off a conducting state of the threshold value compensation circuit and the reset circuit respectively with the gate of the drive transistor, and a light-emitting control circuit conducts a first electrode of the drive transistor and the first electrode of the light-emitting device, to drive the light-emitting device to emit light;

where the reset stage, the threshold value detecting stage, the data writing stage and the driving stage sequentially and continuously form a display frame time period.

Based on the same inventive concept, an embodiment of the present disclosure further provides a display apparatus, including the above pixel circuit. The principle of the display apparatus for solving the problem is similar to that of the above pixel circuit, so that the implementation of the display apparatus may refer to the implementation of the above pixel circuit, and repetition is omitted here.

In some embodiments, the display apparatus may be a mobile phone, a tablet computer, a television, a display, a notebook computer, a digital photo frame, a navigator and any product or component with a display function. Other essential constituent parts of the display apparatus should be understood by those of ordinary skill in the art, which is not repeated here, and should not limit the present disclosure.

According to the above pixel circuit, the driving method therefor and the display apparatus provided by the embodiment of the present disclosure, on the basis of ensuring that the threshold value detecting stage and the data writing stage are separated to be suitable for high-frame-frequency application, by transforming the circuit structure, the threshold value compensation circuit and the drive transistor as well as the reset circuit and the drive transistor are connected through the conduction control circuit containing the low-electric-leakage oxide semiconductor thin film transistor, the added conduction control circuit may reduce the number of the electric-leakage nodes and the related electric-leakage closed circuits, which have an effect when the storage capacitor circuit continuously provides a drive voltage for the gate of the drive transistor, in the pixel circuit, a small number of the low-electric-leakage oxide semiconductor thin film transistors are used as closed circuit switch devices to inhibit the impact of a leakage current on the storage capacitor circuit maintaining the stability of a drive voltage signal, and ensure the voltage holding ratio of a drive signal, thereby giving consideration to low-frame-frequency application.

Apparently, those of skill in the art may make various changes and variations to the embodiments of the present disclosure without departing from the spirit and scope of the embodiments of the present disclosure. In this case, if these changes and variations of the embodiments of the present disclosure fall within the scope of the claims of the present disclosure and their equivalents, the present disclosure also intends to contain these changes and variations.

What is claimed is:

1. A pixel circuit, comprising: a drive transistor, a reset circuit, a data writing circuit, a storage capacitor circuit, a threshold value compensation circuit, a conduction control circuit, a light-emitting control circuit, and a light-emitting device; wherein the reset circuit is configured to reset the storage capacitor circuit, a gate of the drive transistor and a first electrode of the light-emitting device at a reset stage;

the threshold value compensation circuit is configured to write a threshold voltage of the drive transistor into the storage capacitor circuit at a threshold value detecting stage;

the data writing circuit is configured to write a data voltage into the storage capacitor circuit at a data writing stage;

the storage capacitor circuit is configured to provide a drive voltage generated by superposition of the data voltage and the threshold value voltage for the gate of the drive transistor at a driving stage;

the light-emitting control circuit is configured to conduct a first electrode of the drive transistor and the first electrode of the light-emitting device at the driving stage to drive the light-emitting device to emit light; and the conduction control circuit is configured to:

conduct the threshold value compensation circuit with the gate of the drive transistor, and conduct the reset circuit with the gate of the drive transistor at the reset stage, the threshold value detecting stage and the data writing stage; and cut off a conducting state of the threshold value compensation circuit with the gate of the drive transistor, and cut off a conducting state of the reset circuit with the gate of the drive transistor at the driving stage;

wherein the conduction control circuit comprises an oxide semiconductor thin film transistor.

2. The pixel circuit according to claim 1, wherein each of the drive transistor, the reset circuit, the data writing circuit, the threshold value compensation circuit and the light-emitting control circuit comprises a low-temperature polycrystalline silicon thin film transistor.

3. The pixel circuit according to claim 2, wherein the storage capacitor circuit comprises: a first capacitor and a second capacitor;

one end of the first capacitor is electrically connected with the gate of the drive transistor, and the other end of the first capacitor is electrically connected with one end of the second capacitor, the data writing circuit and the reset circuit; and the other end of the second capacitor is electrically connected with a first reference voltage signal end;

wherein the one end of the first capacitor connected with the gate of the drive transistor serves as a first node; the other end of the first capacitor connected with the one end of the second capacitor serves as a second node.

4. The pixel circuit according to claim 3, wherein the conduction control circuit comprises: a first oxide thin film transistor; and a gate of the first oxide thin film transistor is electrically connected with a conduction control signal end, a first electrode of the first oxide thin film transistor is electrically connected with the first node, and a second electrode of the first oxide thin film transistor is electrically connected with the reset circuit and the threshold value compensation circuit respectively.

5. The pixel circuit according to claim 4, wherein the conduction control circuit further comprises: a second oxide thin film transistor; and a gate of the second oxide thin film transistor is electrically connected with the conduction control signal end, a first electrode of the second oxide thin film transistor is electrically connected with the second node, and a second electrode of the second oxide thin film transistor is electrically connected with the data writing circuit and the reset circuit respectively.

6. The pixel circuit according to claim 5 wherein the light-emitting control circuit comprises: a sixth transistor, a gate of the sixth transistor is electrically connected with a light-emitting control signal end, a first electrode of the sixth transistor is electrically connected with the first electrode of the drive transistor, and a second electrode of the sixth transistor is electrically connected with the first electrode of the light-emitting device; and the second electrode of the drive transistor is electrically connected with a first power signal end, and the second electrode of the light-emitting device is electrically connected with a second power signal end.

7. The pixel circuit according to claim 4, wherein the light-emitting control circuit comprises: a sixth transistor, a gate of the sixth transistor is electrically connected with a light-emitting control signal end, a first electrode of the sixth transistor is electrically connected with the first electrode of the drive transistor, and a second electrode of the sixth transistor is electrically connected with the first electrode of the light-emitting device; and the second electrode of the drive transistor is electrically connected with a first power signal end, and the second electrode of the light-emitting device is electrically connected with a second power signal end.

8. The pixel circuit according to claim 7, wherein the sixth transistor is a P-type transistor, and the light-emitting control signal end and the conduction control signal end are a same signal end.

9. The pixel circuit according to claim 3, wherein the data writing circuit comprises: a first transistor, a gate of the first transistor is electrically connected with a first scanning signal end, a first electrode of the first transistor is electrically connected with a data voltage signal end, and a second electrode of the first transistor is electrically connected with the second node.

10. The pixel circuit according to claim 3, wherein the threshold value compensation circuit comprises: a second transistor, a gate of the second transistor is electrically connected with a second scanning signal end, a first electrode of the second transistor is electrically connected with the first electrode of the drive transistor, and a second electrode of the second transistor is electrically connected with the first node through the conduction control circuit.

11. The pixel circuit according to claim 3, wherein the reset circuit comprises: a third transistor, a fourth transistor and a fifth transistor;

a gate of the third transistor and a gate of the fourth transistor are electrically connected with a reset signal end respectively, a first electrode of the third transistor and a first electrode of the fourth transistor are electrically connected with an initialized signal end respectively, a second electrode of the third transistor is electrically connected with the first node through the conduction control circuit, and a second electrode of the fourth transistor is electrically connected with the first electrode of the light-emitting device; and a gate of the fifth transistor is electrically connected with a second scanning signal end of a previous pixel row, a first electrode of the fifth transistor is electrically connected with a second reference voltage signal end, and a second electrode of the fifth transistor is electrically connected with the second node.

12. The pixel circuit according to claim 2, wherein the storage capacitor circuit comprises: a third capacitor and a fourth capacitor;

one end of the third capacitor is electrically connected with the gate of the drive transistor, one end of the fourth capacitor respectively, and the other end of the third capacitor is electrically connected with a first reference voltage signal end; and the other end of the fourth capacitor is electrically connected with the data writing circuit and the reset circuit respectively;

wherein the one end of the third capacitor connected with the gate of the drive transistor serves as a first node; and the other end of the fourth capacitor connected with the data writing circuit and the reset circuit serves as a second node.

13. The pixel circuit according to claim 12, wherein the conduction control circuit comprises: a third oxide thin film transistor; and a gate of the third oxide thin film transistor is electrically connected with a conduction control signal end, a first electrode of the third oxide thin film transistor is electrically connected with the first node, and a second electrode of the third oxide thin film transistor is electrically connected with the one end of the fourth capacitor, the reset circuit and the threshold value compensation circuit respectively.

14. The pixel circuit according to claim 13 wherein the light-emitting control circuit comprises: a sixth transistor, a gate of the sixth transistor is electrically connected with a light-emitting control signal end, a first electrode of the sixth transistor is electrically connected with the first electrode of the drive transistor, and a second electrode of the sixth transistor is electrically connected with the first electrode of the light-emitting device; and the second electrode of the drive transistor is electrically connected with a first power signal end, and the second electrode of the light-emitting device is electrically connected with a second power signal end.

15. The pixel circuit according to claim 12, wherein the data writing circuit comprises: a first transistor, a gate of the first transistor is electrically connected with a first scanning signal end, a first electrode of the first transistor is electrically connected with a data voltage signal end, and a second electrode of the first transistor is electrically connected with the second node.

16. The pixel circuit according to claim 12, wherein the threshold value compensation circuit comprises: a second transistor, a gate of the second transistor is electrically connected with a second scanning signal end, a first electrode of the second transistor is electrically connected with the first electrode of the drive transistor, and a second electrode of the second transistor is electrically connected with the first node through the conduction control circuit.

17. The pixel circuit according to claim 12, wherein the reset circuit comprises: a third transistor, a fourth transistor and a fifth transistor;

a gate of the third transistor and a gate of the fourth transistor are electrically connected with a reset signal end respectively, a first electrode of the third transistor and a first electrode of the fourth transistor are electrically connected with an initialized signal end respectively, a second electrode of the third transistor is electrically connected with the first node through the conduction control circuit, and a second electrode of the fourth transistor is electrically connected with the first electrode of the light-emitting device; and a gate of the fifth transistor is electrically connected with a second scanning signal end of a previous pixel row, a first electrode of the fifth transistor is electrically connected with a second reference voltage signal end, and a second electrode of the fifth transistor is electrically connected with the second node.

18. A driving method for the pixel circuit according to claim 1, comprising:

at the reset stage: conducting the reset circuit and the gate of the drive transistor by the conduction control circuit; and resetting the storage capacitor circuit, the gate of the drive transistor and the first electrode of the light-emitting device by the reset circuit;

at the threshold value detecting stage: conducting the threshold value compensation circuit and the gate of the drive transistor by the conduction control circuit; and writing the threshold voltage of the drive transistor into the storage capacitor circuit by the threshold value compensation circuit;

at the data writing stage: writing the data voltage into the storage capacitor circuit by the data writing circuit; and at the driving stage: cutting off the conducting state of the threshold value compensation circuit and the reset circuit respectively with the gate of the drive transistor by the conduction control circuit; and conducting the first electrode of the drive transistor and the first electrode of the light-emitting device to drive the light-emitting device to emit light by the light-emitting control circuit;

wherein the reset stage, the threshold value detecting stage, the data writing stage and the driving stage sequentially and continuously form a display frame time period.

19. A display apparatus, comprising the pixel circuit according to claim 1.

20. The display apparatus according to claim 19, wherein each of the drive transistor, the reset circuit, the data writing circuit, the threshold value compensation circuit and the light-emitting control circuit comprises a low-temperature polycrystalline silicon thin film transistor.

* * * * *